(12) United States Patent
Mizuta et al.

(10) Patent No.: US 9,308,700 B2
(45) Date of Patent: Apr. 12, 2016

(54) TIRE VULCANIZING METHOD, AND TIRE VULCANIZER

(75) Inventors: Yuichiro Mizuta, Takasago (JP); Masahiro Doe, Takasago (JP); Yasuhiko Fujieda, Takasago (JP); Masatake Toshima, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 712 days.

(21) Appl. No.: 13/591,810

(22) Filed: Aug. 22, 2012

(65) Prior Publication Data

US 2013/0062803 A1 Mar. 14, 2013

(30) Foreign Application Priority Data

Sep. 9, 2011 (JP) .................. 2011-196760

(51) Int. Cl.
*B29D 30/08* (2006.01)
*B29C 35/04* (2006.01)
*B29D 30/06* (2006.01)
*B29C 35/00* (2006.01)

(52) U.S. Cl.
CPC .......... *B29D 30/0601* (2013.01); *B29C 35/007* (2013.01); *B29D 2030/067* (2013.01); *B29D 2030/0675* (2013.01); *B29D 2030/0677* (2013.01)

(58) Field of Classification Search
None
See application file for complete search history.

(56) References Cited

U.S. PATENT DOCUMENTS

| | | | |
|---|---|---|---|
| 4,608,218 A * | 8/1986 | Rummler et al. | 264/315 |
| 7,730,713 B2 * | 6/2010 | Nakano et al. | 60/39.83 |
| 9,028,738 B2 * | 5/2015 | Mizuta | B29D 30/0601 264/326 |
| 2003/0197295 A1 * | 10/2003 | Nakai et al. | 264/40.3 |
| 2004/0247717 A1 | 12/2004 | Okada et al. | |
| 2005/0254969 A1 * | 11/2005 | Masushige et al. | 417/410.4 |
| 2007/0297893 A1 * | 12/2007 | Alon et al. | 415/47 |
| 2009/0211689 A1 | 8/2009 | Christopher et al. | |
| 2010/0007038 A1 * | 1/2010 | Mitamura | B29C 35/007 264/40.3 |
| 2010/0030395 A1 * | 2/2010 | Shimotono et al. | 700/300 |
| 2010/0097025 A1 * | 4/2010 | Chen et al. | 318/471 |
| 2011/0008477 A1 * | 1/2011 | Okada et al. | 425/29 |

FOREIGN PATENT DOCUMENTS

| | | |
|---|---|---|
| JP | 4-14413 | 1/1992 |
| WO | WO/2009/119447 A1 * | 1/2009 |

OTHER PUBLICATIONS

Extended Search Report issued Jan. 23, 2013 in European Patent Application No. 12182127.6.

* cited by examiner

*Primary Examiner* — Matthew Daniels
(74) *Attorney, Agent, or Firm* — Oblon, McClelland, Maier & Neustadt, L.L.P.

(57) ABSTRACT

A tire vulcanizing method reduces consumption energy and increases productivity of vulcanization. This method involves supplying an inert gas to an internal space of the tire via a supply pipe, discharging the gas from the internal space via a return pipe, and supplying the gas from the return pipe to the supply pipe by a rotation type circulation device. A heating device heats the circulated gas. An internal outlet gas temperature sensor detects a temperature of the gas in the return pipe. A controller decreases a rotating speed of the circulation device when the return pipe gas temperature is a rotating speed decrease temperature or more.

14 Claims, 2 Drawing Sheets

TIRE VULCANIZING METHOD, AND TIRE VULCANIZER

BACKGROUND OF THE INVENTION

1. Field of the Invention

The present invention relates to a tire vulcanizing method for vulcanizing a tire by heating and pressurizing the tire, and a tire vulcanizer.

2. Description of the Related Art

For example, Japanese Unexamined Patent Application Publication No. H4-14413 describes a conventional tire vulcanizing method and a conventional tire vulcanizer. The tire vulcanizer includes a mold, a bladder provided in the vulcanizer, and piping for supplying a heating and pressurization medium to an internal space of the bladder and the like. In this tire vulcanizer, an unvulcanized green tire (hereinafter, simply referred to as the "tire") is brought into the mold, the bladder is fitted along an inner surface of the tire, and the heating and pressurization medium is introduced to an interior of the bladder. The mold and the bladder heat and pressurize the tire. Thereby, a vulcanization reaction is progressed in the tire. By this tire vulcanizing method, a tread pattern of the tire is formed. In this tire vulcanizing method, the heating and pressurization medium supplied to the internal space of the bladder is steam and an inert gas (nitrogen gas).

In a tire vulcanizing method described in US Patent Application Publication No. 2010/0007038, a heating and pressurization medium is only an inert gas. A tire vulcanizer of this (refer to FIG. 1 of the above publication) includes a circulation device (6) for circulating the inert gas, and a heating device (8) for heating the inert gas.

In a technique described in Japanese Unexamined Patent Application Publication No. H4-14413, steam is used as the heating and pressurization medium. Therefore, this technique holds a problem that a temperature difference is generated between upper and lower parts of the tire by a drain (problem 1), a problem that productivity of the tire vulcanization is lowered by re-evaporation of the drain (problem 2), and a problem that an energy consumption amount is large due to difficulty in re-use of energy (problem 3).

In a technique described in US Patent Application Publication No. 2010/0007038, energy is to be saved more (problem 4). As described above, the tire vulcanizer described in the same publication includes the circulation device for circulating the inert gas. At the time of heating and pressurizing the tire, this circulation device is always rotated. Therefore, in this technique, the energy may be saved more.

It should be noted that the same publication also describes that the circulation device may be stopped after a fixed time elapses from start of heating and pressurization of the tire ([0074] in the same publication). However, when the circulation device is stopped, a temperature of the entire tire vulcanizer is decreased by radiation of heat. As a result, it is thought that an initial temperature of bladder at a time point when vulcanization of next cycle is started is decreased, and a temperature increase of the tire is delayed. The same publication does not describe a timing for stopping the circulation device.

SUMMARY OF THE INVENTION

An object of the present invention is to provide a tire vulcanizing method and a tire vulcanizer for circulating an inert gas, the tire vulcanizing method and the tire vulcanizer being capable of reducing consumption energy and increasing productivity of a tire vulcanization.

A first aspect of the invention is a tire vulcanizing method for vulcanizing a tire, including a supply step of supplying an inert gas to an internal space of the tire via a supply pipe, a discharge step of discharging the inert gas from the internal space of the tire via a return pipe, a circulation step of supplying the inert gas flowing through the return pipe to the supply pipe by a rotation type circulation device, a heating step of heating the inert gas circulated via the circulation device by a heating device, an outlet gas temperature detection step of detecting a temperature of the inert gas flowing through the return pipe by an outlet gas temperature sensor, and a rotating speed decrease step. The rotating speed decrease step is a step of decreasing the rotating speed of the circulation device by a controller in a case where the detected temperature of the outlet gas temperature sensor is a first temperature or more with respect to a case where the detected temperature of the outlet gas temperature sensor is less than the first temperature.

A second aspect of the invention is a tire vulcanizer for vulcanizing a tire, including a supply pipe through which an inert gas to be supplied to an internal space of the tire flows, a return pipe through which the inert gas discharged from the internal space of the tire flows, a rotation type circulation device for supplying the inert gas flowing through the return pipe to the supply pipe, a heating device for heating the inert gas circulated via the circulation device, an outlet gas temperature sensor for detecting a temperature of the inert gas flowing through the return pipe, and a controller. The controller decreases the rotating speed of the circulation device in a case where the detected temperature of the outlet gas temperature sensor is a first temperature or more with respect to a case where the detected temperature of the outlet gas temperature sensor is less than the first temperature.

In the present invention, the consumption energy can be reduced, and the productivity of the tire vulcanization can be increased.

DESCRIPTION OF THE PREFERRED EMBODIMENTS

Figure 1:
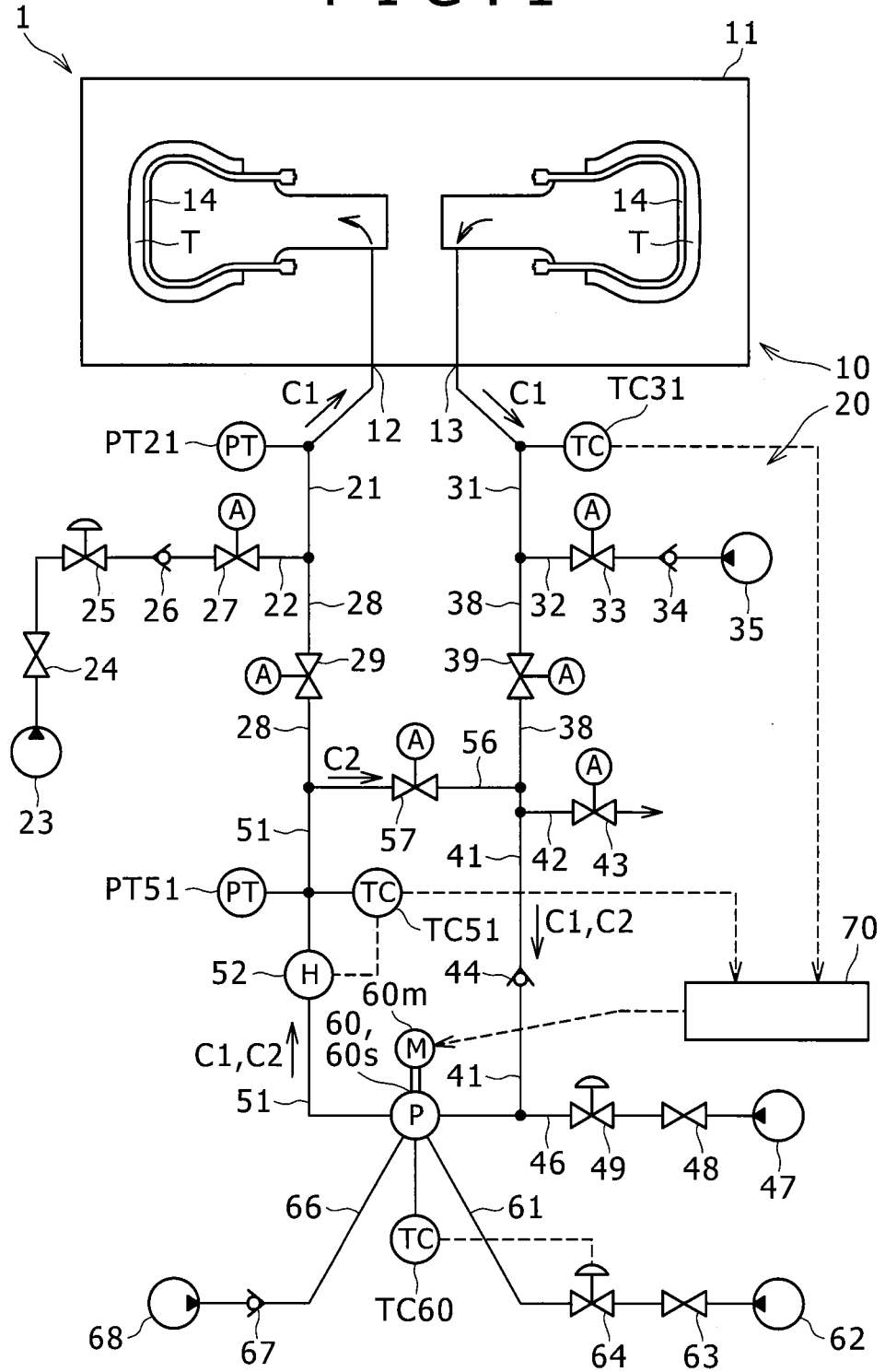
FIG. 1 is a schematic view of a tire vulcanizer.
Figure 2:
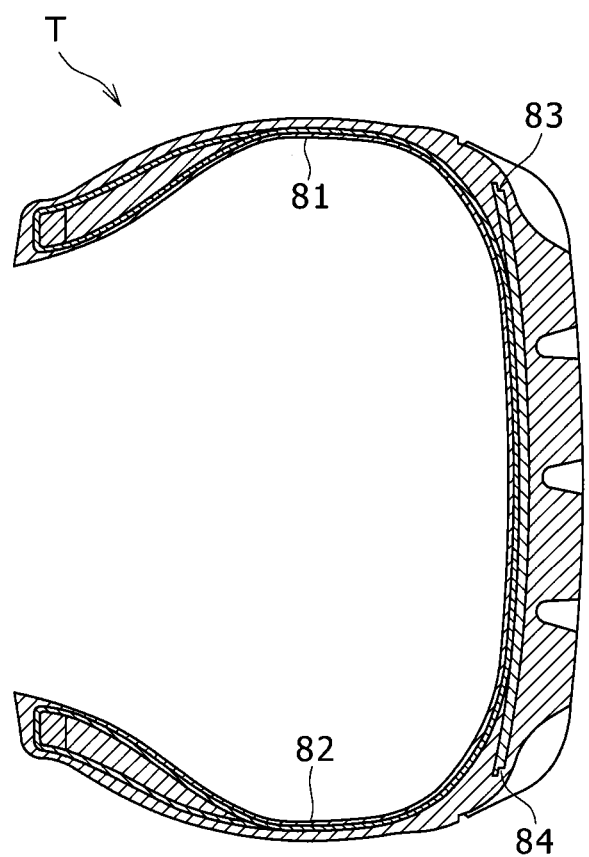
FIG. 2 is a sectional view of a tire, serving as an illustrative view of temperature measurement points in an experiment.

With reference to FIGS. 1 and 2, an embodiment of a tire vulcanizer 1 and an embodiment of a tire vulcanizing method will be described.

[Configuration]

The tire vulcanizer 1 is a device for vulcanizing a tire T. The tire vulcanizer 1 is used in a step of forming a tread pattern of the tire T. In general, tens of or hundreds of tire vulcanizers 1 are installed in one plant. The tire vulcanizer 1 is connected to the main piping provided in the plant, and utilities (inert gas and the like) are supplied and discharged. Hereinafter, the "connection" indicates to connect in such a manner that the inert gas and the like can be distributed.

In this tire vulcanizer 1, a medium for heating and pressurizing the tire T from the inside thereof is the inert gas. This inert gas is a stable gas at a vulcanization temperature of the tire T (temperature at the time of vulcanizing the tire T), for example, a nitrogen gas. Water vapor is not contained in this inert gas in principle. However, a minute amount of water vapor (about less than 1% by a volume ratio) may be mixed in this inert gas. Hereinafter, the inert gas will be also simply referred to as the "gas".

This tire vulcanizer 1 includes a vulcanization device 10 in which the tire T is applied, piping 20 connected to the vulcanization device 10, sensors (sensors PT21, TC31, PT51, TC51, and TC60) provided in the piping 20, and a controller 70.

(Vulcanization Device)

The vulcanization device 10 includes a mold 11 inside which the tire T is loaded, a bladder 14 fitted along an inner surface of the tire T, an internal inlet 12 serving as an inlet of a gas to be supplied to the bladder 14, and an internal outlet 13 serving as an outlet of a gas discharged from the bladder 14. By replacing the mold 11 and the bladder 14, size of the tire T to be vulcanized can be changed.

The mold 11 is a mold for forming a tread pattern on the tire T. The mold 11 is heated, so that the tire T can be heated from an outer surface.

The bladder 14 is a rubber member for heating and pressurizing the tire T from the inner surface. The gas is introduced to an internal space of the bladder 14 (to an internal space of the tire T). It should be noted that the bladder 14 is required to be replaced after used for a period of time. The bladder 14 is not necessarily provided. That is, the vulcanization device 10 (tire vulcanizer 1) may be bladderless type.

(Piping)

The piping 20 are formed by pipes for supplying and discharging the gas to and from the vulcanization device 10, a circulation device 60 provided in the pipes, and valves provided in the pipes. A detail of the piping 20 is as follows.

The piping 20 include a supply pipe 21 and a return pipe 31 respectively connected to the vulcanization device 10 (it should be noted that the supply pipe 21 will be also simply called as the "pipe 21", and the return pipe 31 will be also simply called as the "pipe 31." The same is applied to pipes described below). The piping 20 include a low-pressure pipe 22 connected to the supply pipe 21, and an exhaust pipe 32 connected to the return pipe 31.

The piping 20 include a supply side connection pipe 28 and a supply side circulation pipe 51 for connecting the supply pipe 21 and the circulation device 60. The piping 20 include a return side connection pipe 38 and a return side circulation pipe 41 for connecting the return pipe 31 and the circulation device 60. In the piping 20, taking the circulation device 60 as a start point, the pipes 51, 28, 21, the vulcanization device 10, the pipes 31, 38, and 41 form a closed circuit C1.

The piping 20 include a bypass pipe 56 connected to the supply side circulation pipe 51 and the return side circulation pipe 41. In the piping 20, taking the circulation device 60 as a start point, the pipes 51, 56, and 41 form a closed circuit C2.

The piping 20 include an exhaust pipe 42 to atmosphere and a high-pressure supply pipe 46 respectively connected to the return side circulation pipe 41. The piping 20 include a cooling supply pipe 61 (cooling pipe) and a cooling discharge pipe 66 respectively provided in the circulation device 60. The piping 20 include the valves provided in the above pipes. It should be noted that connection and arrangement of the constituent elements of the piping 20 may be appropriately changed within a range that functions of the constituent elements can be obtained.

The supply pipe 21 is a pipe for supplying the gas to the internal space of the tire T (supply step). The supply pipe 21 connects to the internal space of the tire T via the internal inlet 12.

The low-pressure pipe 22 is a pipe for supplying a low-pressure gas (described later) to the internal space of the tire T. In the low-pressure pipe 22, a low-pressure gas inlet 23, a manual valve 24, a pressure control valve 25, a check valve 26, and a switching valve 27 are provided in this order from the upstream side.

The low-pressure gas inlet 23 is an inlet of the gas from the main piping to the tire vulcanizer 1.

The manual valve 24 is a manual switching valve to be used at the time of maintenance of the tire vulcanizer 1.

The pressure control valve 25 is a valve for controlling (adjusting) pressure of the gas to be supplied from the low-pressure gas inlet 23 to the internal space of the tire T.

The check valve 26 is a valve for preventing backflow of the gas from the side of the pipes 21 and 28 to the side of the low-pressure gas inlet 23.

The switching valve 27 is a valve for switching connection and disconnection between the pipes 21 and 28 and the low-pressure gas inlet 23. The switching valve 27 is a valve to be opened and closed in accordance with an external signal (the same is applied to switching valves 29, 33, 39, 43, and 57). The switching valve 27 (29, 33, 39, 43, and 57) is for example a pneumatically-driven automatic switching valve (or may be an electrically-driven automatic switching valve or the like).

The switching valve 29 is provided in the supply side connection pipe 28. The switching valve 29 is a valve for switching connection and disconnection between the pipes 51 and 56 and the pipes 22 and 21.

The return pipe 31 is a pipe for discharging the gas from the internal space of the tire T (discharge step). The return pipe 31 connects to the internal space of the tire T via the internal outlet 13.

The exhaust pipe 32 is a pipe for exhausting the gas to the outside of the tire vulcanizer 1. In the exhaust pipe 32, the switching valve 33, a check valve 34, and an exhaust port 35 are provided in this order from the upstream side (side of the pipe 31). The switching valve 33 is a valve for switching connection and disconnection between the pipes 31 and 38 and the exhaust port 35. The check valve 34 is a valve for preventing backflow of the gas from the side of the exhaust port 35 to the side of the pipes 31 and 38. The exhaust port 35 is a part for exhausting the gas to the main piping of the plant.

The switching valve 39 is provided in the return side connection pipe 38. The switching valve 39 is a valve for switching connection and disconnection between the pipes 41 and 56 and the pipes 31 and 32.

A check valve 44 is provided in the return side circulation pipe 41. The check valve 44 is a valve for preventing backflow of the gas from the side of the high-pressure supply pipe 46 and the circulation device 60 to the side of the pipes 38, 42, and 56.

The exhaust pipe 42 to atmosphere is a pipe for releasing the gas in the return side circulation pipe 41 to an atmosphere. The switching valve 43 is provided in the exhaust pipe 42 to atmosphere. The switching valve 43 is a valve for switching connection and disconnection between the pipe 41 and the atmosphere.

The high-pressure supply pipe 46 is a pipe for supplying a high-pressure gas (described later) charged in the internal space of the tire T to the pipe 41 (to the closed circuits C1 and C2). In the high-pressure supply pipe 46, a high-pressure gas inlet 47, a manual valve 48, and a pressure control valve 49 are provided in this order from the upstream side.

The high-pressure gas inlet 47 is an inlet of the gas from the main piping to the tire vulcanizer 1. Pressure of the "high-pressure gas" supplied from the high-pressure gas inlet 47 is much higher than the pressure of the "low-pressure gas" supplied from the low-pressure gas inlet 23.

The manual valve 48 is a manual switching valve to be used at the time of the maintenance of the tire vulcanizer 1.

The pressure control valve 49 is a valve for controlling (adjusting) the pressure of the gas supplied from the high-pressure gas inlet 47 to the pipe 41.

A heating device 52 is provided in the supply side circulation pipe 51. The heating device 52 (heater) heats the gas circulated by the circulation device 60 (heating step).

The bypass pipe 56 is a pipe for connecting the pipes 51 and 28 and the pipes 41 and 38. The switching valve 57 is provided in the bypass pipe 56. The switching valve 57 is a valve for switching connection and disconnection of the bypass pipe 56.

The circulation device 60 is a device for circulating the gas. The circulation device 60 supplies the gas flowing through the return pipe 31 to the supply pipe 21 (circulation step). The circulation device 60 is for example a compressor, and for example a pump (blower). The circulation device 60 has a pressurization ability which is larger than a pressure loss generated when the gas is circulated.

This circulation device 60 is a rotation type. The circulation device 60 includes a bearing portion 60s. Since the gas circulated by the circulation device 60 has a high temperature, at the time of rotating the circulation device 60, the bearing portion 60s has a high temperature. A drive source of the circulation device 60 is a motor 60m. When rotation speed of the motor 60m is changed, the rotating speed of the circulation device 60 is changed.

The cooling supply pipe 61 (cooling pipe) is a pipe for supplying a cooling medium to the bearing portion 60s (cooling medium supply step). This cooling medium is for example cooling water. In the cooling supply pipe 61, a cooling medium inlet 62, a manual valve 63, and a flow rate control valve 64 are provided in this order from the upstream side. The cooling medium inlet 62 is a part for supplying the cooling medium from the main piping to the vulcanizer 1. The manual valve 63 is a manual switching valve to be used at the time of the maintenance of the tire vulcanizer 1. The flow rate control valve 64 is a valve for controlling a flow rate of the cooling medium volume through the cooling supply pipe 61.

The cooling discharge pipe 66 is a pipe for discharging the cooling medium from the circulation device 60. In the cooling discharge pipe 66, a check valve 67 and a cooling medium outlet 68 are provided in this order from the upstream side. The check valve 67 is a valve for preventing backflow of the cooling medium from the side of the cooling medium outlet 68 to the side of the circulation device 60. The cooling medium outlet 68 is a part for discharging the cooling medium from the tire vulcanizer 1 to the main piping.

(Sensors and Controller)

In the piping 20, the following sensors are provided.

The internal inlet gas pressure sensor PT21 detects pressure of the gas flowing through the supply pipe 21. Hereinafter, the internal inlet gas pressure sensor PT21 will be also simply called as the "sensor PT21" (the same is applied to other sensors). The sensor PT21 is provided near the internal inlet 12.

The internal outlet gas temperature sensor TC31 (outlet gas temperature sensor) detects a temperature of the gas flowing through the return pipe 31 (outlet gas temperature detection step). The sensor TC31 is provided near the internal outlet 13.

The heating device outlet temperature sensor TC51 (inlet gas temperature sensor) detects a temperature of the gas heated in the heating device 52 (inlet gas temperature detection step). The sensor TC51 is provided on the outlet side (downstream side) of the heating device 52 in the pipe 51. It should be noted that the detected temperature of the sensor TC51 is substantially equal to a temperature of the gas at the internal inlet 12.

The heating device outlet pressure sensor PT51 detects pressure of the gas heated in the heating device 52. The sensor PT51 is provided on the outlet side (downstream side) of the heating device 52.

The bearing temperature sensor TC60 detects a temperature of the bearing portion 60s of the circulation device 60 (bearing temperature detection step).

The controller 70 changes the rotating speed of the motor 60m in accordance with the detected temperature inputted from the internal outlet gas temperature sensor TC31 (a detail will be described later). It should be noted that a sensor other than the sensor TC31 such as the sensor TC51 may be connected to the controller 70.

[Operation]

Next, an operation of the tire vulcanizer 1 (tire vulcanizing method) will be described. An outline of the operation of the tire vulcanizer 1 is as follows. Firstly, the tire vulcanizer 1 is preheated (heated). Next, the tire T is carried into the mold 11, and the bladder 14 is expanded by the low-pressure gas, so that the bladder 14 is fitted along the inner surface of the tire T (installment of the tire T). At this time, the high-pressure gas is preheated while being circulated in the closed circuit C2. Next, the high-pressure gas is introduced into the tire T so as to heat and pressurize the tire T. The rotating speed of the circulation device 60 is decreased after the elapse of a certain period time. During the vulcanization of the tire T, the bearing portion 60s is cooled. Hereinafter, the steps will be described in detail.

(Preheating of Tire Vulcanizer 1)

The tire vulcanizer 1 is preheated by heating the mold 11 and the piping 20. The tire vulcanizer 1 is preheated before loading the tire T in the mold 11. The mold 11 is heated by a heat source provided on the tire vulcanizer 1. The piping 20 are heated as follows.

Firstly, a short circuit is formed between the internal inlet 12 and the internal outlet 13 by a preheating short-circuit means (not shown). Thereby, the closed circuit C1 becomes a circuit (system) not connecting to the space in the bladder 14. Next, the switching valves 29 and 39 are opened. While the heating device 52 heats the gas, the circulation device 60 circulates the gas in the closed circuit C1 (closed circuit C1 not connecting to the space in the bladder 14). At this time, the rotating speed of the circulation device 60 is the rotating speed which is lower than the maximum rotating speed (such as 1,000 RPM). This is to prevent an overload of the circulation device 60. It should be noted that the closed circuit C1 has a smaller thermal capacity than the mold 11. Therefore, even when the rotating speed of the circulation device 60 is set to be low as above, the closed circuit C1 is heated for a much shorter time than the mold 11. It should be noted that the gas used for preheating is not necessarily the inert gas described above. Preheating is also performed immediately after replacement of the mold 11 and the bladder 14.

(Installment of Tire T)

Next, the tire T is loaded in the bladder 14. This step is performed as follows.

The unvulcanized tire T (green tire) is carried from the outside of the tire vulcanizer 1. This tire T is put in the mold 11 (on a lower mold). Next, the switching valves 29, 33, and 39 are closed, and the switching valve 27 is opened. Next, the low-pressure gas is supplied from the low-pressure gas inlet 23 to the internal space of the tire T (internal space of the bladder 14) via the pipes 22 and 21. The pressure of this gas is adjusted by the pressure control valve 25. For example, the pressure of the gas of about 0.1 MPa at the low-pressure gas inlet 23 is regulated to about 0.01 MPa at an outlet of the pressure control valve 25. The gas is supplied to the internal space, so that the bladder 14 is expanded. The bladder 14 is fitted along the inner surface of the tire T. Thereby, the tire T is installed in the bladder 14 and held to the vulcanization device 10.

(Preheating of High-Pressure Gas)

In parallel with the loading of the tire T, the high-pressure gas is preheated as follows.

The switching valves 29, 39, and 43 are closed and the switching valve 57 is opened. That is, the connection of the closed circuit C2 is provided. The high-pressure gas is supplied from the high-pressure gas inlet 47 to the closed circuit C2 via the pipe 46. While the heating device 52 heats the gas, the circulation device 60 circulates the gas in the closed circuit C2. At this time, the circulation device 60 is rotated at fixed speed (such as 500 RPM) for example. It should be noted that in a case where the detected pressure of the heating device outlet pressure sensor PT51 becomes designed pressure or more, the gas in the closed circuit C2 is exhausted to the atmosphere by opening the switching valve 43.

In such a way, before heating and pressurizing the tire T, the high-pressure gas is preheated. Therefore, from the beginning of heating and pressurization of the tire T, the high-temperature and high-pressure gas can be supplied to the internal space of the tire T. As a result, a time for increasing a temperature of the tire T to the vulcanization temperature is shortened, so that productivity of the tire T vulcanization can be improved.

(Vulcanization of Tire T)

Next, the tire T is heated and pressurized, so that the tire T is vulcanized. The mold 11 heats the tire T from the outer surface side of the tire T. The bladder 14 heats and pressurizes the tire T from the inner surface side of the tire T. The tire T is heated and pressurized through the bladder 14 as follows.

Firstly, the mold 11 is closed (by squeezing an upper mold and the lower mold).

Next, the switching valves 27, 33, and 43 are closed. The switching valves 29 and 39 are opened, and immediately after that, the switching valve 57 is closed. That is, the connection of the closed circuit C1 is provided so that the gas is circulated in the bladder 14. The high-pressure gas is supplied, circulated, and heated as follows.

(Supply of High-Pressure Gas)

The high-pressure gas is supplied to the closed circuit C1 as follows.

Immediately after providing the connection of the closed circuit C1, pressure of the supply pipe 21 is once decreased. The internal inlet gas pressure sensor PT21 detects this pressure decrease. In accordance with this detection result, the pressure control valve 49 is opened. The high-pressure gas is supplied to the closed circuit C1. Then, the pressure of the supply pipe 21 is recovered for a shorter time (than a temperature described later).

The pressure control valve 49 adjusts the pressure of this high-pressure gas. For example, in a case where the tire T is for a passenger vehicle (not for a large truck and the like but for a general passenger vehicle), the pressure control valve 49 adjusts the pressure of the gas in such a manner that the pressure in the supply pipe 21 becomes about 2 MPa for example. It should be noted that the pressure control valve 49 does not necessarily adjust the pressure of the gas (the pressure control valve 49 is not necessarily provided). That is, the gas may be supplied to the pipe 41 with the pressure of the gas at the high-pressure gas inlet 47.

(Circulation of High-Pressure Gas)

The circulation device 60 circulates the gas in the closed circuit C1. This step is performed as follows.

The gas is supplied to the internal space of the tire T via the supply pipe 21 (supply step). The gas is discharged from the internal space of the tire T via the return pipe 31 (discharge step). The rotation type circulation device 60 supplies the gas flowing through the return pipe 31 to the supply pipe 21 (circulation step). At this time, rotation speed of the circulation device 60 is set to maximum speed (such as 1,750 RPM). This is to rapidly heat the gas and the tire T. It should be noted that the pressure of the gas circulated in the closed circuit C1 may be appropriately adjusted. For example, in accordance with the detected pressure of the sensor PT21, the pressure control valve 49 may control the pressure of this gas. For example, in a case where the detected pressure of the sensor PT21 becomes predetermined pressure or more, the gas in the closed circuit C1 may be exhausted to the atmosphere by opening the switching valve 43.

(Heating of High-Pressure Gas)

The heading device 52 heats the gas circulated in the closed circuit C1 via the circulation device 60 (heating step). This step is performed as follows.

As described above, after the low-pressure gas expands the bladder 14, the high-pressure gas is supplied to the closed circuit C1. When supply of the high-pressure gas to the closed circuit C1 is started, the temperature of the gas of the supply pipe 21 and the like is decreased. In accordance with the decrease in the temperature of the gas, the heating device 52 heats the gas. The heating device 52 adjusts an output based on the detected temperature of the heating device outlet temperature sensor TC51. For example, the heating device 52 adjusts the output in such a manner that the detected temperature of the sensor TC51 is maintained to have a predetermined value. It should be noted that when the heating device 52 heats the gas, the detected temperature of the sensor TC31 is increased after the increase in the detected temperature of the sensor TC51.

(Decrease in Rotating Speed of Circulation Device 60)

During the vulcanization of the tire T, the controller 70 decreases the rotating speed of the circulation device 60 after the elapse of a certain period of time. This step is performed as follows.

A rotating speed decrease temperature T1 (first temperature) is preliminarily set in the controller 70. The rotating speed decrease temperature T1 is a temperature at which a vulcanization reaction is progressed in the tire T or more. The rotating speed decrease temperature T1 is 200° C. for example.

The internal outlet gas temperature sensor TC31 detects the temperature of the gas flowing through the return pipe 31 (outlet gas temperature detection step). A detection result of the sensor TC31 is inputted to the controller 70. The detected temperature of the internal outlet gas temperature sensor TC31 is gradually increased from start of the heating and the pressurization of the tire T, and reaches to the rotating speed decrease temperature T1.

In a case where the detected temperature of the sensor TC31 is the rotating speed decrease temperature T1 or more, the controller 70 decreases the rotating speed of the circulation device 60 (of the motor 60m) more than a case where the detected temperature of the sensor TC31 is less than the rotating speed decrease temperature T1 (rotating speed decrease step). Specifically, for example, the controller 70 decreases the rotating speed of the circulation device 60 from 1,750 RPM which is the maximum rotating speed to 500 RPM. A time from the start of the heating and the pressurization of the tire T (start of the supply of the high-pressure gas to the internal space of the tire T) until the detected temperature of the sensor TC31 reaches the rotating speed decrease temperature T1 is about 5 minutes 30 seconds for example. It should be noted that immediately after the replacement of the bladder 14, this time takes long since the bladder 14 is not sufficiently heated. This time is gradually shortened as a vulcanization cycle (one cycle is from a start to an end of the heating and the pressurization of one tire T) is repeated under the same condition. This is because a temperature of the tire vulcanizer 1 gradually comes close to an equilibrium state.

(Cooling of Bearing Portion 60s of Circulation Device 60)

During rotation of the circulation device 60, the bearing portion 60s is cooled. This step is performed as follows.

The cooling supply pipe 61 supplies the cooling medium to the bearing portion 60s (cooling medium supply step). The bearing temperature sensor TC60 detects the temperature of the bearing portion 60s (bearing temperature detection step). The flow rate control valve 64 controls the flow rate of the cooling medium flowing through the cooling supply pipe 61 based on the detected temperature of the sensor TC60 (flow rate control step). For example, the flow rate control valve 64 controls the flow rate of the cooling medium in such a manner that the detected temperature of the sensor TC60 is maintained to have a fixed value. For example, as described above, when the controller 70 decreases the rotating speed of the circulation device 60, the temperature of the bearing portion 60s of the circulation device 60 is decreased, so that the detected temperature of the sensor TC60 is decreased. At this time, the flow rate control valve 64 decreases the flow rate of the cooling medium.

(End of Vulcanization of Tire T)

When a predetermined time (such as 8 minutes 30 seconds) elapses after the start of the heating and the pressurization of the tire T, the tire vulcanizer 1 ends the heating and the pressurization of the tire T. This step is performed as follows.

The switching valves 29 and 39 are closed and immediately after that, the switching valve 33 is opened. Then, the gas is exhausted from the exhaust port 35 to the main piping. When a certain time elapses after start of exhaust of the gas, the detected pressure of the internal inlet gas pressure sensor PT21 is decreased to predetermined pressure. Next, the mold 11 is opened, the vulcanized tire T is unloaded, and the unloaded tire T is carried to a next step (outside of the tire vulcanizer 1). Now, one cycle of the vulcanization of the tire T is ended, and a cycle of vulcanization of a next tire T (green tire) can be started. It should be noted that in a case where the cycles of the vulcanization are continuously performed, preheating of the tire vulcanizer 1 is not required.

At the same time as the exhaust of the gas as above, the high-pressure gas in the closed circuit C2 may be preheated. This step is performed as follows. The switching valves 29 and 39 are closed as above, and further, the switching valve 57 is opened. That is, the connection of the closed circuit C2 is provided. While the heating device 52 heats the gas, the circulation device 60 circulates the gas in the closed circuit C2.

The vulcanization time of the tire T (time from the start to the end of the heating and the pressurization of the tire T) is determined based on a temperature history of a part of the tire T where the vulcanization is most slowly progressed (history of the temperature at the time of the vulcanization). A detail of determination of the vulcanization time of the tire T is as follows.

Generally in vulcanization of rubber, a lowering degree of physical properties (physical properties influencing quality of a tire) depends on a degree of vulcanization. In a case where the degree of vulcanization is insufficient, the physical properties are extremely lowered. In a case where the degree of vulcanization is excessive, the physical properties are gradually lowered. This degree of vulcanization is different depending on a position inside the tire T. This is because the temperature history is different depending on the position inside the tire T. For example, in the tire T for a general passenger vehicle or a light truck, the degree of vulcanization is most slowly progressed near the belt edges 83 and 84 (refer to FIG. 2) inside the tire T. This is known by experiments and analyses. Thus, based on a temperature history of a part of the tire T where a temperature is most slowly increased (part where the degree of vulcanization is most slowly progressed), a "required vulcanization time" is determined. Further, an actual vulcanization time is longer than this "required vulcanization time". This is due to consideration with variation in the dimension of the tire T and the temperature history.

A further detail of the determination of the vulcanization time of the tire T is as follows. The required vulcanization time can be determined when the temperature history of the part inside the tire T is found. The temperature history of the part inside the tire T can be determined by an analysis when a boundary condition can be set. However, this boundary condition is not easily set. This is because temperature distribution of the bladder 14 and the mold 11 is not uniform. Thus, with using a test green tire in which a temperature sensor is assembled inside the tire T, the temperature history of the part inside the tire T is measured. By comparing and examining an analysis result and a measurement result, teq(To) described later is calculated, so that the required vulcanization time of the tire T is calculated. Hereinafter, calculation of teq(To) will be described.

In general, temperature dependence of a reaction rate in a vulcanization reaction of rubber is given by the following Arrhenius equation.

$$k = A \cdot \exp[-Ea/(R \cdot T)] \quad (1)$$

k is a reaction rate constant on a temperature T. A is a constant of reaction frequency non-related to the temperature. Ea is activation energy. R is a gas constant. T is an absolute temperature. From the equation (1), a reaction rate ratio between two temperatures can be obtained, so that a reaction rate ratio between the temperature T(t) and a reference temperature To can be obtained. The temperature T(t) is a temperature changed over time. The reference temperature To is a fixed temperature. The reaction rate ratio between the temperature T(t) and the reference temperature To is integrated from a heating start time t1 to a heating end time t2. Then, the total equivalent time teq(To) is determined as in the following equation.

$$teq(To) = \int \exp[Ea/\{R(1/To - 1/T(t))\}] dt \quad (2)$$

However, teq(To) satisfies the following condition. The degree of vulcanization reaction is equivalent between a case where the vulcanization reaction is progressed with the temperature history T(t) in a period from the heating start time t1 to the heating end time t2 and a case where the vulcanization reaction is progressed on the reference temperature To in a period of the total equivalent time teq(To).

[Experiment]

The tire T was heated and pressurized by the tire vulcanizer 1 and the tire vulcanizing method described above (Example). The tire T was also heated and pressurized by a conventional tire vulcanizer and a conventional tire vulcanizing method (Comparative Examples 1 and 2). The temperature and power consumption of the tire T were compared.

(Experiment Condition)

Experiment conditions of the Example are as follows. The pressure of the gas to be supplied to the supply pipe 21 (high-pressure inert gas) is 2.0 MPa. A set temperature of the heating device 52 is 220° C. The circulation device 60 is a blower having an ability of generating differential pressure of 0.14 MPa at maximum. The maximum rotating speed of the circulation device 60 is 1,750 RPM. After the start of the heating and the pressurization of the tire T, at a time point when the detected temperature of the internal outlet gas temperature sensor TC31 became 200° C., the rotating speed of the circulation device 60 was decreased from 1,750 RPM to 500 RPM.

Experiment conditions of the Comparative Example 1 are the same as the above Example in principle. However, during the vulcanization of the tire T, the circulation device 60 was continuously rotated at 1,750 RPM.

Experiment conditions of the Comparative Example 2 are as follows. As well as the invention described in Japanese Unexamined Patent Application Publication No. H4-14413, the tire T was heated and pressurized by steam and a nitrogen gas. At the beginning of the vulcanization of the tire T, saturated steam of 1.4 MPa was brought into the internal space of the tire T. The bladder 14 was heated by condensation heat of the saturated steam. In 1 to 2 minutes after an interior of the bladder 14 was filled with the saturated steam and a drain, the nitrogen gas was brought into the internal space of the tire T. The temperature of the nitrogen gas is the ambient temperature and the pressure is 2.1 MPa.

(Measurement of Temperature)

FIG. 2 shows a section of the tire T. Measurement points of the temperature of the tire T are a surface of an inner side wall 81 on the upper side, a surface of an inner side wall 82 on the lower side, vicinity of the belt edge 83 on the upper side, and vicinity of the belt edge 84 on the lower side. The inner side walls 81 and 82 are positions easily influenced by a fluid in the internal space of the tire T (Comparative Example 2 in particular). The vicinities of the belt edges 83 and 84 are positions where the vulcanization is most slowly progressed in the tire T. The temperature was measured by a thermocouple buried in the tire T before the vulcanization (at the time of forming) of the tire T.

Tables 1 to 3 show measurement results of the temperature. Tables 1 to 3 show the results in 5 minutes 30 seconds after the start of the heating and the pressurization of the tire T and in 8 minutes 30 seconds after the start. Table 1 shows the result of the Example, Table 2 shows the result of the Comparative Example 1, and Table 3 shows the result of the Comparative Example 2.

TABLE 1

| | Elapsed time | |
|---|---|---|
| | 5 min. 30 sec. | 8 min. 30 sec. |
| Upper inner side wall (° C.) | 183.9 | 188.1 |
| Lower inner side wall (° C.) | 181.7 | 186.2 |
| Upper belt edge (° C.) | 160.3 | 174.0 |
| Lower belt edge (° C.) | 166.8 | 176.2 |

TABLE 2

| | Elapsed time | |
|---|---|---|
| | 5 min. 30 sec. | 8 min. 30 sec. |
| Upper inner side wall (° C.) | 190.9 | 197.5 |
| Lower inner side wall (° C.) | 188.7 | 195.9 |
| Upper belt edge (° C.) | 169.1 | 186.4 |
| Lower belt edge (° C.) | 175.2 | 185.9 |

TABLE 3

| | Elapsed time | |
|---|---|---|
| | 5 min. 30 sec. | 8 min. 30 sec. |
| Upper inner side wall (° C.) | 185.0 | 188.1 |
| Lower inner side wall (° C.) | 175.9 | 180.9 |
| Upper belt edge (° C.) | 169.1 | 180.1 |
| Lower belt edge (° C.) | 175.7 | 184.3 |

The result of the Example was as follows.

The temperature of the gas of the internal outlet 13 (also simply called as the "gas temperature") reached 180° C. in about 1 minute after the start of the heating and the pressurization. The gas temperature was gradually increased after that, and became 200° C. in 5 minutes 30 seconds after the start of the heating and the pressurization. The vulcanization was ended in 8 minutes 30 seconds after the start of the heating and the pressurization.

A temperature increase in the parts inside the tire T (also simply called as the "temperature increase") from 5 minutes 30 seconds after the start of the heating and the pressurization to 8 minutes 30 seconds after the start was as follows. An average temperature increase in the inner side walls 81 and 82 was 4.35 degrees. An average temperature increase in the belt edges 83 and 84 was 11.6 degrees.

The result of the Comparative Example 1 (with no decrease in the rotating speed of the circulation device 60) was as follows.

The temperature increase in the parts inside the tire T from 5 minutes 30 seconds after the start of the heating and the pressurization to 8 minutes 30 seconds after the start was as follows. The average temperature increase in the inner side walls 81 and 82 was 6.9 degrees. The average temperature increase in the belt edges 83 and 84 was 14 degrees. As described, the temperature increase in the parts inside the tire T was larger in the Comparative Example 1 than the Example. This is because in the Comparative Example 1, the rotating speed of the circulation device 60 was not decreased and more heat was given to the tire T than the Example.

The temperature increase in the inner side walls 81 and 82 was increased to a large extent in the Comparative Example 1 in comparison to the Example (and the Comparative Example 2). As a result, the inner side walls 81 and 82 were more excessively vulcanized than the belt edges 83 and 84.

It should be noted that a difference in the conditions between the Comparative Example 1 and the Example is whether or not the rotating speed of the circulation device 60 is decreased in 5 minutes 30 seconds after the start of the heating and the pressurization. That is, at a time point of 5 minutes 30 seconds after the start of the heating and the pressurization, the experiment conditions are the same for the Comparative Example 1 and the Example. Therefore, the result in 5 minutes 30 seconds after the start of the heating and the pressurization should be the same for the Comparative Example 1 and the Example. However, as shown in Tables 1 and 2, the result was different between the Comparative Example 1 and the Example. This difference in the result is thought to be caused by factors outside the tire vulcanizer 1 such as misalignment of an application position of the thermocouple, and a difference in an initial temperature (temperature before the vulcanization) of the tire T.

The result of the Comparative Example 2 (heating and pressurization with steam and the nitrogen gas) was as follows.

The temperature increase in the parts inside the tire T from 5 minutes 30 seconds after the start of the heating and the pressurization to 8 minutes 30 seconds after the start was as follows. The average temperature increase in the inner side walls 81 and 82 was 4.05 degrees. The average temperature increase in the belt edges 83 and 84 was 9.8 degrees. As described, the temperature increase in the parts inside the tire T was reduced in order of the Comparative Example 1, the Example, and the Comparative Example 2.

In the Comparative Example 2, the temperature of the inner side wall 82 on the lower side was lower than the temperature of the inner side wall 81 on the upper side. A temperature difference between the inner side wall 81 on the upper side and the inner side wall 82 on the lower side was larger in the Comparative Example 2 than the Example (and the Comparative Example 1). This temperature difference is generated by an influence of the drain.

(Measurement of Power Consumption)

The power consumption of the Example and the Comparative Example 1 was compared. This power consumption was measured by measuring power consumption (consumption electric power) of a power source of the heating device 52 and the circulation device 60 (refer to FIG. 1). In the Example, the power consumption in a period from 5 minutes 30 seconds after the heating and the pressurization to 8 minutes 30 seconds from the start was measured, that is, the power consumption was measured after the rotating speed of the circulation device 60 was decreased and before the heating and the pressurization were ended. In the Comparative Example 1, the power consumption in a period from the start of the heating and the pressurization to 8 minutes 30 seconds from the start was measured. Table 4 shows a measurement result of the power consumption.

TABLE 4

|  | Power consumption of circulation device and heating device |
|---|---|
| Comparative Example 1 (kW) | 3.41 |
| Example (kW) | 2.48 |

The power consumption of the Comparative Example 1 was 3.41 kW. The power consumption of the Example was 2.48 kW. This is a result for one tire vulcanizer (for one tire). As described above, in general, tens of or hundreds of tire vulcanizers 1 are installed in one plant. Therefore, for one plant, power consumption can be decreased by tens of kW to hundreds of kW in the Example relative to the Comparative Example 1 (a detail of effects will be described later).

(Comparison of Vulcanization Time Between Example and Comparative Example 2)

As described above, the temperature increase in the parts inside the tire T was smaller in the Comparative Example 2 than the Example. Therefore, the vulcanization time can be shortened more in the Example than the Comparative Example 2. The vulcanization time of the Example is determined based on a time until the belt edges 83 and 84 reach a required degree of vulcanization. The vulcanization time of the Comparative Example 2 is determined based on a time until the belt edge 84 on the lower side reaches a required vulcanization degree. Then, it is found that in the Example, the vulcanization time can be shortened by about 10% of the Comparative Example 2.

(Other Comparison Between Example and Comparative Example 2)

It should be noted that in a technique as in the Comparative Example 2 (refer to Japanese Unexamined Patent Application Publication No. H4-14413 described above), in general, high-temperature steam is supplied from a utility area of a plant into a tire vulcanizer through a long piping. Therefore, since heat of the steam is radiated from the piping, energy is unavoidably consumed.

Meanwhile, in the tire vulcanizer 1 (Example), the heating device 52 in the tire vulcanizer 1 heats the gas. Therefore, in comparison to a vulcanizer provided with no heating device 52 (technique as in the Comparative Example 2), energy consumption can be reduced in the tire vulcanizer 1.

[Effects]

Next, the effects of the tire vulcanizer 1 shown in FIG. 1 and the tire vulcanizing method will be described.

(Effect 1-1)

The tire vulcanizing method for vulcanizing the tire T includes the supply step of supplying the gas (inert gas) to the internal space of the tire T via the supply pipe 21, the discharge step of discharging the gas from the internal space of the tire T via the return pipe 31, the circulation step of supplying the gas flowing through the return pipe 31 to the supply pipe 21 by the rotation type circulation device 60, the heating step of heating the gas circulated via the circulation device 60 by the heating device 52, and the outlet gas temperature detection step of detecting the temperature of the gas flowing through the return pipe 31 by the internal outlet gas temperature sensor TC31 (outlet gas temperature sensor).

This tire vulcanizing method further includes the rotating speed decrease step. The rotating speed decrease step is a step of decreasing the rotating speed of the circulation device 60 by the controller 70 in a case where the detected temperature of the internal outlet gas temperature sensor TC31 is the rotating speed decrease temperature T1 (first temperature) or more with respect to a case where the detected temperature of the internal outlet gas temperature sensor TC31 is less than the rotating speed decrease temperature T1.

(a) Since the rotating speed of the circulation device 60 is decreased, energy for rotating the circulation device 60 can be reduced. (b) When the rotating speed of the circulation device 60 is decreased, heat generation of the circulation device 60 itself is reduced. Therefore, energy for a heat generation amount of the circulation device 60 can be reduced. (c) When the rotating speed of the circulation device 60 is decreased, flow speed of the gas circulated by the circulation device 60 is lowered, so that a pressure loss in the piping 20 through which the gas flows is reduced. Since the pressure loss of the gas is reduced, energy consumed by the circulation device 60 can be reduced. According to the above effects (a) to (c), when the rotating speed of the circulation device 60 is decreased, the energy consumed by the circulation device 60 is reduced by exponentiation (exponentially reduced).

When the rotating speed of the circulation device 60 is decreased, the flow speed of the gas circulated by the circulation device 60 is reduced, so that heat generation from the piping 20 through which the gas flows to the outside of the tire vulcanizer 1 is reduced. Therefore, energy consumed by the heating device 52 for heating the gas can be reduced.

This tire vulcanizing method is a method for vulcanizing the tire T by supplying the gas to the internal space of the tire T. That is, there is no need for supplying steam to the internal space of the tire T in order to vulcanize the tire T. Therefore, the problems (problems 1 to 3) caused by using steam as a heating and pressurization medium of the tire T are not generated. Since the above (problem 1) is not generated, the quality of the tire T can be improved. Since the above (problem 2) is not generated, the productivity of the tire T vulcanization can be increased. Since the above (problem 3) is not generated, the energy consumption caused by using steam as the heating and pressurization medium can be suppressed.

(Effect 1-2)

The circulation device 60 used in this tire vulcanizing method includes the bearing portion 60s. This tire vulcanizing method includes the cooling medium supply step of supplying the cooling medium to the bearing portion 60s via the cooling supply pipe 61 (cooling pipe), the bearing temperature detection step of detecting the temperature of the bearing portion 60s by the bearing temperature sensor TC60, and the flow rate control step. The flow rate control step is a step of controlling the flow rate of the cooling medium flowing through the cooling supply pipe 61 by the flow rate control valve 64 based on the detected temperature of the bearing temperature sensor TC60.

When the bearing portion 60s is cooled by the cooling medium, the gas circulated by the circulation device 60 is cooled by a cooled amount of the bearing portion 60s. When the gas is cooled, the heating device 52 may be required to heat the gas. In a case where the heating device 52 heats the gas, the energy is consumed by the heating device 52. Meanwhile, in the flow rate control step, the flow rate control valve 64 controls the flow rate of the cooing medium flowing through the cooling supply pipe 61 based on the detected temperature of the bearing temperature sensor TC60. Therefore, the bearing portion 60s is cooled to a minimum extent. Thus, the energy consumed by the heating device 52 can be reduced.

(Effect 1-3)

The tire vulcanizer 1 for vulcanizing the tire T includes the supply pipe 21 through which the gas to be supplied to the internal space of the tire T flows, the return pipe 31 through which the gas discharged from the internal space of the tire T flows, the rotation type circulation device 60 for supplying the gas flowing through the return pipe 31 to the supply pipe 21, the heating device 52 for heating the gas circulated via the circulation device 60, the internal outlet gas temperature sensor TC31 for detecting the temperature of the gas flowing through the return pipe 31, and the controller 70. The controller 70 decreases the rotating speed of the circulation device 60 in a case where the detected temperature of the internal outlet gas temperature sensor TC31 is the rotating speed decrease temperature T1 or more with respect to a case where the detected temperature of the internal outlet gas temperature sensor TC31 is less than the rotating speed decrease temperature T1. With this tire vulcanizer 1, the same effect as the above (Effect 1-1) can be obtained.

(Effect 1-4)

The circulation device 60 of the tire vulcanizer 1 includes the bearing portion 60s. This tire vulcanizer 1 includes the cooling supply pipe 61 for supplying the cooling medium to the bearing portion 60s, the bearing temperature sensor TC60 for detecting the temperature of the bearing portion 60s, and the flow rate control valve 64 for controlling the flow rate of the cooling medium flowing through the cooling supply pipe 61 based on the detected temperature of the bearing temperature sensor TC60. With this tire vulcanizer 1, the same effect as the above (Effect 1-2) can be obtained.

MODIFIED EXAMPLE 1

In the above embodiment, in a case where the detected temperature of the internal outlet gas temperature sensor TC31 becomes the rotating speed decrease temperature T1 or more, the controller 70, so to speak suddenly, decreases the rotating speed of the circulation device 60 (for example, from 1,750 RPM to 500 RPM). However, the controller 70 may gradually decrease the rotating speed of the circulation device 60 (modified example 1). Hereinafter, a difference between the above embodiment and the modified example 1 will be described.

A rotating speed gradual decrease temperature range T2-T1 serving as a range from a rotating speed gradual decrease start temperature T2 (second temperature) to the rotating speed decrease temperature T1 is set in the controller 70. The rotating speed gradual decrease start temperature T2 is smaller than the rotating speed decrease temperature T1. The rotating speed gradual decrease start temperature T2 is smaller than the rotating speed decrease temperature T1 by for example 10 degrees, or for example 20 degrees or 30 degrees. For example, the rotating speed gradual decrease start temperature T2 is 190° C., and the rotating speed decrease temperature T1 is 200° C.

The controller 70 gradually decreases the rotating speed of the circulation device 60 in accordance with an increase in the detected temperature of the internal outlet gas temperature sensor TC31 within the rotating speed gradual decrease temperature range T2-T1 (rotating speed gradual decrease step). The term "gradually" indicates "continuously" or "in plural steps". A detail of this step (specific example) is as follows.

At the beginning of the heating and the pressurization of the tire T (when the detected temperature of the sensor TC31 is less than the rotating speed gradual decrease start temperature T2), the rotating speed of the circulation device 60 is the maximum rotating speed (1,750 RPM). When the heating and the pressurization of the tire T are continued, the detected temperature of the sensor TC31 reaches the rotating speed gradual decrease start temperature T2 (190° C.). After that, the detected temperature of the sensor TC31 is gradually increased within the rotating speed gradual decrease temperature range T2-T1 (within a range from 190° C. to 200° C.). In accordance with this, the controller 70 gradually decreases the rotating speed of the circulation device 60 from the maximum rotating speed (1,750 RPM) to 500 RPM for example.

A reason why the rotating speed of the circulation device 60 is gradually decreased will be described. In the experiment described above, the detected temperature of the internal outlet gas temperature sensor TC31 reaches 180° C. in about 1 minute after the start of the heating and the pressurization, and is gradually increased to 200° C. after that. From this, it can be thought that with the detected temperature of the sensor TC31 being within the range from about 190° C. to about 200° C., even when the rotating speed of the circulation device 60 is gradually decreased, the tire T can be sufficiently heated. Thus, in the tire vulcanizer 1, the rotating speed of the circulation device 60 is gradually decreased. It should be noted that a relationship between an increase amount of the detected temperature of the sensor TC31 and a decrease amount of the rotating speed of the circulation device 60 can be appropriately set by repeatedly performing the experiment or the like.

(Effect 2-1)

Next, effects of the tire vulcanizer 1 and the tire vulcanizing method of the modified example 1 will be described.

The rotating speed gradual decrease temperature range T2-T1 serving as the range from the rotating speed gradual decrease start temperature T2 (second temperature) to the rotating speed decrease temperature T1 is set in the controller 70 used in this tire vulcanizing method. The rotating speed gradual decrease start temperature T2 is smaller than the rotating speed decrease temperature T1. This tire vulcanizing method further includes the rotating speed gradual decrease step of gradually decreasing the rotating speed of the circulation device 60 by the controller 70 in accordance with the increase in the detected temperature of the internal outlet gas temperature sensor TC31 within the rotating speed gradual decrease temperature range T2-T1.

Therefore, in a period from the start of the heating and the pressurization of the tire T until the detected temperature of the internal outlet gas temperature sensor TC31 becomes the rotating speed decrease temperature T1, the energy consumed by the rotation of the circulation device 60 can be more reduced than a case where the circulation device 60 is rotated by the fixed rotating speed.

(Effect 2-2)

The rotating speed gradual decrease temperature range T2-T1 serving as the range from the rotating speed gradual decrease start temperature T2 (second temperature) to the rotating speed decrease temperature T1 is set in the controller 70 of the tire vulcanizer 1. The rotating speed gradual decrease start temperature T2 is smaller than the rotating speed decrease temperature T1. The controller 70 gradually decreases the rotating speed of the circulation device 60 in accordance with the increase in the detected temperature of the internal outlet gas temperature sensor TC31 within the rotating speed gradual decrease temperature range T2-T1. With this tire vulcanizer 1, the same effect as the above (effect 2-1) can be obtained.

MODIFIED EXAMPLE 2

In the modified example 1, the controller 70 gradually decreases the rotating speed of the circulation device 60 in accordance with the increase in the detected temperature of the internal outlet gas temperature sensor TC31. However, the controller 70 may gradually decrease the rotating speed of the circulation device 60 in accordance with a decrease in a difference between the detected temperature of the sensor TC51 and the detected temperature of the sensor TC31 (modified example 2). Hereinafter, a difference between the modified example 1 and the modified example 2 will be described.

As described above, the heating device outlet temperature sensor TC51 (inlet gas temperature sensor) detects the temperature of the gas heated in the heating device 52 (inlet gas temperature detection step). It should be noted that this "inlet gas temperature sensor" is not necessarily provided near the outlet of the heating device 52 but may be provided in the supply pipe 21 for example.

In a case where the detected temperature of the internal outlet gas temperature sensor TC31 is the rotating speed gradual decrease start temperature T2 or more, the controller 70 gradually decreases the rotating speed of the circulation device 60 in accordance with the decrease in the difference between the detected temperature of the heating device outlet temperature sensor TC51 and the detected temperature of the internal outlet gas temperature sensor TC31 (rotating speed gradual decrease step).

The decrease in the rotating speed of the circulation device 60 based on the difference between the detected temperature of the sensor TC51 and the detected temperature of the sensor TC31 will be described. As described above, at the beginning of the heating and the pressurization of the tire T, the temperature increase in the detected temperature of the sensor TC31 is delayed behind the temperature increase of the sensor TC51. When the heating and the pressurization of the tire T are continued, the difference between the detected temperature of the sensor TC31 and the detected temperature of the sensor TC51 is gradually decreased. Thus, in accordance with the decrease in the difference between the detected temperatures, the controller 70 gradually decreases the rotating speed of the circulation device 60.

(Effect 3-1)

Next, effects of the tire vulcanizer 1 and the tire vulcanizing method of the modified example 2 will be described.

The rotating speed gradual decrease start temperature T2 which is smaller than the rotating speed decrease temperature T1 is set in the controller 70 used in this tire vulcanizing method. This tire vulcanizing method further includes the inlet gas temperature detection step of detecting the temperature of the gas heated in the heating device 52 by the heating device outlet temperature sensor TC51 (inlet gas temperature sensor), and the rotating speed gradual decrease step of the modified example 2. The rotating speed gradual decrease step of the modified example 2 is a step of gradually decreasing the rotating speed of the circulation device 60 by the controller 70 in accordance with the decrease in the difference between the detected temperature of the heating device outlet temperature sensor TC51 and the detected temperature of the internal outlet gas temperature sensor TC31 in a case where the detected temperature of the internal outlet gas temperature sensor TC31 is the rotating speed gradual decrease start temperature T2 or more. With this tire vulcanizing method, the same effect as the above (Effect 2-1) can be obtained.

(Effect 3-2)

The tire vulcanizer 1 further includes the heating device outlet temperature sensor TC51 for detecting the temperature of the gas heated in the heating device 52. The rotating speed gradual decrease start temperature T2 which is smaller than the rotating speed decrease temperature T1 is set in the controller 70. The controller 70 gradually decreases the rotating speed of the circulation device 60 in accordance with the decrease in the difference between the detected temperature of the heating device outlet temperature sensor TC51 and the detected temperature of the internal outlet gas temperature sensor TC31 in a case where the detected temperature of the heating device outlet temperature sensor TC51 is the rotating speed gradual decrease start temperature T2 or more. With this tire vulcanizer 1, the same effect as the above (Effect 3-1) can be obtained.

What is claimed is:

1. A method, comprising:
   supplying an inert gas to an internal space of a tire provided in a tire vulcanizer via a supply pipe
   and discharging the inert gas from the internal space of the tire via a return pipe by circulating
   the inert gas received from the return pipe toward the supply pipe with a rotation type circulation device;
   heating the inert gas supplied to the internal space via the supply pipe with a heating device;
   detecting a temperature of the inert gas flowing through the return pipe with an outlet gas temperature sensor; and
   operating the rotation type circulation device at a first rotation speed, when the outlet gas temperature sensor detects a temperature below a temperature T1, and operating the rotation type circulation device at a second rotation speed, when the outlet gas temperature sensor detects a temperature at or above the temperature T1, the first rotation speed being greater than the second rotation speed.

2. The method according to claim 1, comprising:
   operating the rotation type circulation device at the first rotation speed, when the outlet gas temperature sensor detects a temperature below a temperature T2, and operating the rotation type circulation device at the second rotation speed, when the outlet gas temperature sensor detects a temperature at or above the temperature T1, the temperature T1 being greater than the temperature T2; and gradually decreasing the rotation speed from the first rotation speed to the second rotation speed, when the outlet gas temperature sensor detects a temperature at or above the temperature T2 but below the temperature T1.

3. The method according to claim 2, comprising:
detecting a temperature of the inert gas heated by the heating device with an inlet gas temperature sensor; and
gradually decreasing the rotation speed from the first rotation speed to the second rotation speed, when the outlet gas temperature sensor detects a temperature at or above the temperature T2 but below the temperature T1, based on a difference between the temperature detected by the outlet gas temperature sensor and a temperature detected by the inlet gas temperature sensor.

4. The method according to claim 2, comprising decreasing the rotation speed in a plurality of steps in rotation speed from the first rotation speed to the second rotation speed, when the outlet gas temperature sensor detects a temperature at or above the temperature T2 but below the temperature T1.

5. The method according to claim 2, comprising continuously decreasing the rotation speed from the first rotation speed to the second rotation speed, when the outlet gas temperature sensor detects a temperature at or above the temperature T2 but below the temperature T1.

6. The method according to claim 1, comprising:
supplying a cooling medium to a bearing portion of the rotation type circulation device with a cooling pipe;
detecting a temperature of the bearing portion with a bearing temperature sensor; and
increasing or decreasing a flow rate of the cooling medium flowing through the cooling pipe with a flow rate control valve, based on a temperature detected by the bearing temperature sensor.

7. The method according to claim 6, comprising increasing the rate at which the cooling medium flows through the cooling pipe, when the bearing temperature sensor detects a temperature at or above a temperature T3, and decreasing the rate at which the cooling medium flows through the cooling pipe, when the bearing temperature sensor detects a temperature below the temperature T3.

8. A tire vulcanizer, comprising:
an internal space located inside of a tire when the tire is present in the tire vulcanizer;
a supply pipe that is an inlet to the internal space;
a return pipe that is an outlet from the internal space;
a rotation type circulation device provided between the return pipe and the supply pipe that, in operation, rotates to move the inert gas received from the return pipe toward the supply pipe to circulate the inert gas into the internal space via the supply pipe and out of the internal space via the return pipe;
a heating device provided between the return pipe and the supply pipe that, in operation, heats the inert gas that is supplied to the internal space via the supply pipe;
an outlet gas temperature sensor that, in operation, detects a temperature of the inert gas flowing through the return pipe; and
a controller that operates the rotation type circulation device at a first rotation speed, when the outlet gas temperature sensor detects a temperature below a temperature T1, and operates the rotation type circulation device at a second rotation speed, when the outlet gas temperature sensor detects a temperature at or above the temperature T1, the first rotation speed being greater than the second rotation speed.

9. The tire vulcanizer according to claim 8, wherein:
the controller is a controller that operates the rotation type circulation device at the first rotation speed, when the outlet gas temperature sensor detects a temperature below a temperature T2 and operates the rotation type circulation device at the second rotation speed, when the outlet gas temperature sensor detects a temperature at or above the temperature T1, the temperature T1 being greater than the temperature T2; and
the controller is a controller that operates the rotation type circulation device by gradually decreasing the rotation speed from the first rotation speed to the second rotation speed, when the outlet gas temperature sensor detects a temperature at or above the temperature T2 but below the temperature T1.

10. The tire vulcanizer according to claim 9, wherein:
the tire vulcanizer comprises an inlet gas temperature sensor that, in operation, detects a temperature of the inert gas heated by the heating device; and
the controller is a controller that operates the rotation type circulation device by gradually decreasing the rotation speed from the first rotation speed to the second rotation speed, when the outlet gas temperature sensor detects a temperature at or above the temperature T2 but below the temperature T1, based on a difference between the temperature detected by the outlet gas temperature sensor and a temperature detected by the inlet gas temperature sensor.

11. The tire vulcanizer according to claim 9, wherein the controller is a controller that operates the rotation type circulation device by decreasing the rotation speed in a plurality of steps in rotation speed from the first rotation speed to the second rotation speed, when the outlet gas temperature sensor detects a temperature at or above the temperature T2 but below the temperature T1.

12. The tire vulcanizer according to claim 9, wherein the controller is a controller that operates the rotation type circulation device by continuously decreasing the rotation speed from the first rotation speed to the second rotation speed, when the outlet gas temperature sensor detects a temperature at or above the temperature T2 but below the temperature T1.

13. The tire vulcanizer according to claim 8, wherein
the rotation type circulation device comprises a bearing portion;
the tire vulcanizer further comprises
a cooling pipe that, in operation, supplies a cooling medium to the bearing portion;
the tire vulcanizer comprises a bearing temperature sensor that, in operation, detects a temperature of the bearing portion;
the tire vulcanizer comprises a flow rate control valve that is capable of controlling a rate at which the cooling medium flows through the cooling pipe; and
the controller is a controller that operates the flow rate control valve based on a temperature detected by the bearing temperature sensor.

14. The tire vulcanizer according to claim 13, wherein the controller is a controller that operates the flow rate control valve by increasing the rate at which the cooling medium flows through the cooling pipe, when the bearing temperature sensor detects a temperature at or above a temperature T3, and operates the flow rate control valve by decreasing the rate at which the cooling medium flows through the cooling pipe, when the bearing temperature sensor detects a temperature below the temperature T3.

* * * * *